US006969057B2

(12) United States Patent
Baltz et al.

(10) Patent No.: US 6,969,057 B2
(45) Date of Patent: Nov. 29, 2005

(54) METHOD AND APPARATUS FOR ADJUSTING AND POSITIONING AIR CAPS

(75) Inventors: James P. Baltz, Waterville, OH (US); Brian J. Shull, Auburn, IN (US)

(73) Assignee: Illinois Tool Works Inc., Glenview, IL (US)

( * ) Notice: Subject to any disclaimer, the term of this patent is extended or adjusted under 35 U.S.C. 154(b) by 382 days.

(21) Appl. No.: 10/016,596

(22) Filed: Oct. 30, 2001

(65) Prior Publication Data

US 2003/0080207 A1 May 1, 2003

(51) Int. Cl.[7] ......................... B23P 19/04; B25B 13/00; B25B 13/48; B25B 1/24

(52) U.S. Cl. ....................... 269/270; 29/240; 29/281.1; 29/283; 7/138; 7/164; 81/176.15; 81/121.1

(58) Field of Search ................................ 239/290, 291, 239/292, 296, 300, 301, 306, 314, 390, 391, 239/392, 394, 397, 418, 422, 423, 424, 424.5, 239/425, 425.5, 457, DIG. 14, 1, 8, 11, 580; 33/381, 370, 334, 347; 29/240, 281.1, 283; 269/270; 7/138, 164; 81/176.15, 121.1, 3.4

(56) References Cited

U.S. PATENT DOCUMENTS

| | | | | |
|---|---|---|---|---|
| 2,743,963 | A * | 5/1956 | Peeps | 239/290 |
| 4,106,697 | A * | 8/1978 | Sickles et al. | 239/690.1 |
| 4,125,944 | A * | 11/1978 | Esposito et al. | 33/347 |
| 4,141,503 | A * | 2/1979 | Beck | 239/394 |
| 4,274,208 | A * | 6/1981 | Yakkel | 33/371 |
| 4,478,370 | A * | 10/1984 | Hastings | 239/707 |
| 4,744,518 | A * | 5/1988 | Toth | 239/297 |
| 4,785,544 | A * | 11/1988 | Heinsius et al. | 33/334 |
| 4,888,880 | A * | 12/1989 | Parker | 33/645 |
| 4,908,949 | A * | 3/1990 | Jaccard | 33/334 |
| 5,344,078 | A * | 9/1994 | Fritz et al. | 239/296 |
| 5,366,330 | A * | 11/1994 | Cosenza | 411/405 |
| 5,402,579 | A * | 4/1995 | Smith | 33/354 |
| 6,230,986 | B1 * | 5/2001 | Vacher et al. | 239/297 |

* cited by examiner

*Primary Examiner*—Davis Hwu
(74) *Attorney, Agent, or Firm*—Barnes & Thornburg LLP

(57) ABSTRACT

A device and a method are provided for positioning an air cap of a pneumatically aided atomizer. The air cap has air horns extending from its face to provide flows of air to aid in atomizing and shaping the atomized particle stream. The method and apparatus contemplate providing a device having at least one first opening adapted to receive the horns and a first level for indicating when the horns received in the at least one first opening are in a desired orientation.

19 Claims, 2 Drawing Sheets

METHOD AND APPARATUS FOR ADJUSTING AND POSITIONING AIR CAPS

FIELD OF THE INVENTION

This invention relates to equipment for the setup of equipment for atomizing and dispensing fluent materials, such as coatings and the like.

BACKGROUND OF THE INVENTION

Automatic spray equipment is well known in the prior art. There are, for example, the devices illustrated and described in U.S. Pat. Nos. 4,744,518; 4,915,303; 5,044,564; 5,279,461; 5,322,221; 5,344,078; and 5,456,414, and the references cited therein. The disclosures of these references are hereby incorporated herein by reference. No representation is intended by this listing that this is a complete listing of all pertinent prior art, or that a thorough search of all pertinent prior art has been conducted, or that no better prior art exists. Nor should any such representation be inferred.

Many automatic spray dispensers are pneumatic dispensers. That is, compressed gases or mixtures of gases, typically compressed air, are used in the atomization and dispensing of the materials they spray. Typically, jets of air are directed onto two opposite sides of a jet of the material to be atomized and dispensed, assisting in the atomization of the material and shaping the atomized material into somewhat of a fan shape, fanning out from the orifice of the nozzle through which the material is dispensed. The portion of a dispenser which directs the opposed air jets onto the stream of material being dispensed through the nozzle is generally referred to as an air cap. Such an air cap typically includes a pair of projections, sometimes called horns, which contain passageways and orifices through which the shaping air is directed onto the stream of material. The streams of air flowing onto the two opposite surfaces of the stream of material flatten it into a somewhat elliptical cross-section, fan shaped pattern. In automatic coating dispensing equipment, generally, equipment which is not manipulated by a human operator, the dispenser is usually set up so that the long dimension of the cross section of the fan shaped pattern is oriented either horizontally (sometimes hereinafter referred to as a horizontal fan spray) or vertically (sometimes hereinafter referred to as a vertical fan spray), depending upon the requirements and/or preferences of a particular application. In the past, this has meant using sometimes cumbersome devices and methods to establish that the air cap is properly oriented to produce a horizontal fan spray or a vertical fan spray.

DISCLOSURE OF THE INVENTION

According to one aspect of the invention, a device is provided for positioning an air cap having air horns extending therefrom on a pneumatically aided atomizer. The device includes at least one first opening adapted to receive the horns and a first level for indicating when the horns received in the at least one first opening are in a first orientation.

Illustratively according to this aspect of the invention, the device further includes at least one second opening adapted to receive the horns and a second level for indicating when the horns received in the at least one second opening are in the first orientation.

Further illustratively according to this aspect of the invention, the at least one second opening and second level are oriented orthogonally with respect to the at least one first opening and first level, respectively, so that the second level indicates when the horns received in the at least one first opening are in a second orientation orthogonal to the first orientation.

Additionally illustratively according to this aspect of the invention, the device includes a first surface extending generally in a first direction when the horns are received in the at least one first opening and a second surface extending generally in a second direction opposite the first direction when the horns are received in the at least one first opening.

Illustratively according to this aspect of the invention, the device includes a first surface extending generally in a first direction when the horns are received in one of the at least one first opening and the at least one second opening and a second surface extending generally in a second direction opposite the first direction when the horns are received in one of the at least one first opening and the at least one second opening.

Further illustratively according to this aspect of the invention, the at least one first opening extends through the device from the first surface to the second surface.

Additionally illustratively according to this aspect of the invention, the at least one second opening extends through the device from the first surface to the second surface.

Illustratively according to this aspect of the invention, the device includes at least a third surface extending between the first and second surfaces. The third surface is configured to facilitate manipulation of the air cap when the horns are received in one of the at least one first opening and the at least one second opening.

According to another aspect of the invention, a method is provided for positioning an air cap having air horns extending therefrom on a pneumatically aided atomizer. The method includes providing a device having at least one first opening adapted to receive the horns and a first level for indicating when the horns received in the at least one first opening are in a first orientation.

Illustratively according to this aspect of the invention, providing a device having at least one first opening adapted to receive the horns and a first level for indicating when the horns received in the at least one first opening are in a first orientation includes providing a device having at least one first opening adapted to receive the horns, at least one second opening adapted to receive the horns, a first level for indicating when the horns received in the at least one first opening are in the first orientation, and a second level for indicating when the horns received in the at least one second opening are in the first orientation.

Further illustratively according to this aspect of the invention, providing a device having at least one first opening adapted to receive the horns, at least one second opening adapted to receive the horns, a first level for indicating when the horns received in the at least one first opening are in the first orientation, and a second level for indicating when the horns received in the at least one second opening are in the first orientation includes providing a device having at least one first opening adapted to receive the horns, at least one second opening adapted to receive the horns and oriented orthogonally with respect to the at least one first opening, a first level for indicating when the horns received in the at least one first opening are in the first orientation, and a second level oriented orthogonally with respect to the first level for indicating when the horns received in the at least least one second opening are in the first orientation.

Additionally illustratively according to this aspect of the invention, providing a device having at least one first opening adapted to receive the horns and a first level for indicating when the horns received in the at least one first opening are in a first orientation includes providing a device having a first surface extending generally in a first direction when the horns are received in the at least one first opening and a second surface extending generally in a second direction opposite the first direction when the horns are received in the at least one first opening.

Illustratively according to this aspect of the invention, providing a device having at least one first opening, a first surface extending generally in a first direction when the horns are received in the at least one first opening and a second surface extending generally in a second direction opposite the first direction when the horns are received in the at least one first opening together include providing at least one first opening which extends through the device from the first surface to the second surface.

Further illustratively according to this aspect of the invention, providing a device having at least one first opening adapted to receive the horns and a first level for indicating when the horns received in the at least one first opening are in a first orientation and at least one second opening adapted to receive the horns and a second level for indicating when the horns received in the at least one second opening are in a first orientation together include providing a device including a first surface extending generally in a first direction when the horns are received in one of the at least one first opening and the at least one second opening and a second surface extending generally in a second direction opposite the first direction when the horns are received in one of the at least one first opening and the at least one second opening.

Additionally illustratively according to this aspect of the invention, providing a device having a first surface extending generally in a first direction when the horns are received in the at least one first opening and a second surface extending generally in a second direction opposite the first direction when the horns are received in the at least one first opening include providing a device including at least a third surface extending between the first and second surfaces, the third surface configured to facilitate manipulation of the air cap when the horns are received in the at least one first opening.

BRIEF DESCRIPTION OF THE DRAWINGS

The invention may best be understood by referring to the following detailed description and accompanying drawings which illustrate the invention. In the drawings.

DETAILED DESCRIPTIONS OF ILLUSTRATIVE EMBODIMENTS

Figure 1:
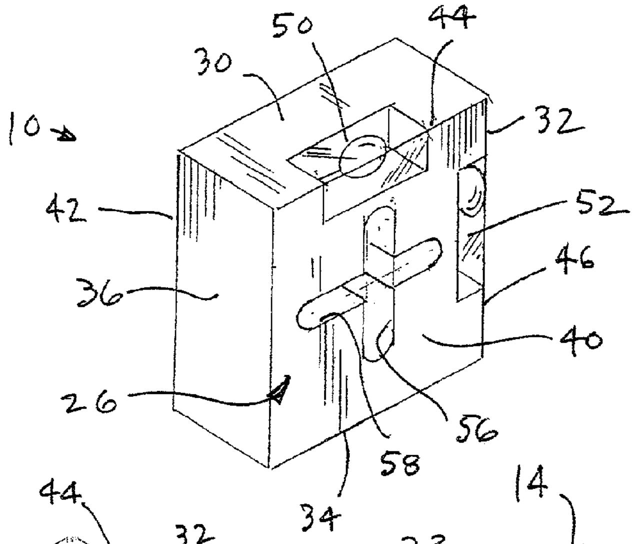
FIG. 1 illustrates a perspective view of a device constructed according to the invention.
Figure 2:
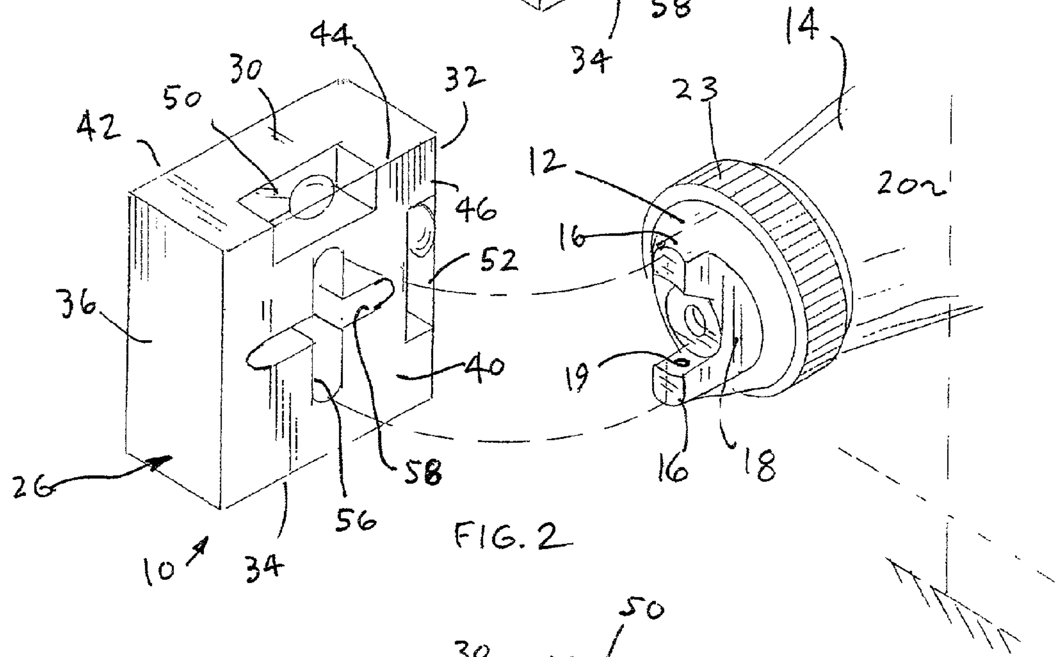
FIG. 2 illustrates a perspective view of the device illustrated in FIG. 1 being placed on an air cap of an automatic spray gun with the air cap generally oriented to produce a horizontal fan shaped spray.
Figure 3:
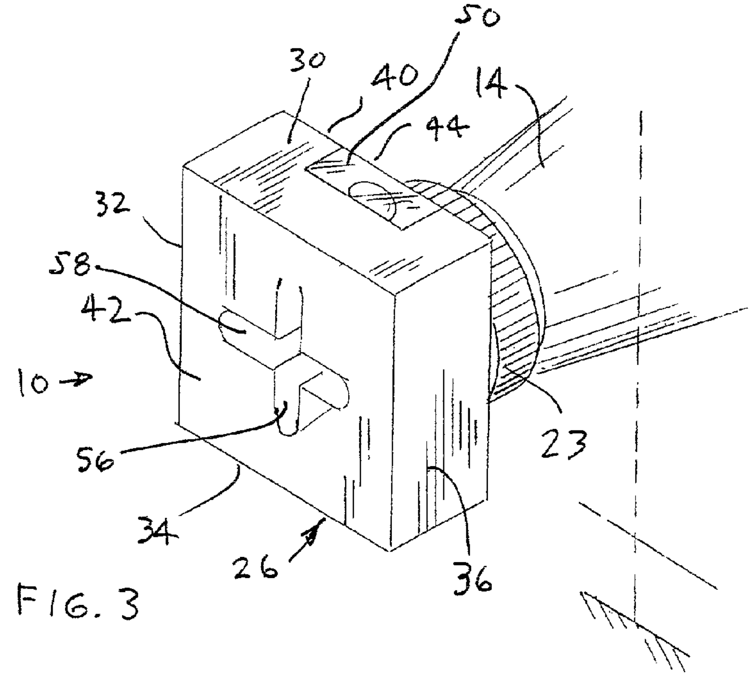
FIG. 3 illustrates a perspective view of the device illustrated in FIG. 1 on an air cap of an automatic spray gun.
Figure 4:
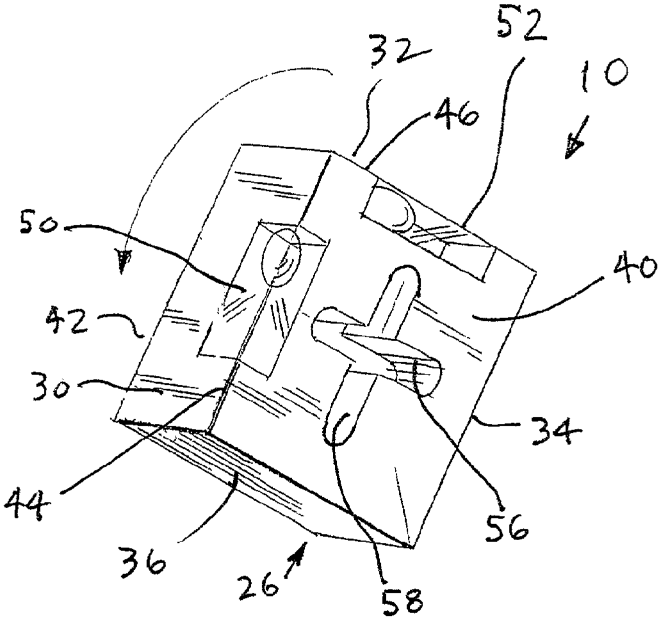
FIG. 4 illustrates a perspective view of the device illustrated in FIG. 1 illustrating how the device can be used to reorient an air cap of an automatic spray gun from an orientation to produce a horizontal fan shaped spray to an orientation to produce a vertical fan shaped spray or from an orientation to produce a vertical fan shaped spray to an orientation to produce a horizontal fan shaped spray.
Figure 5:
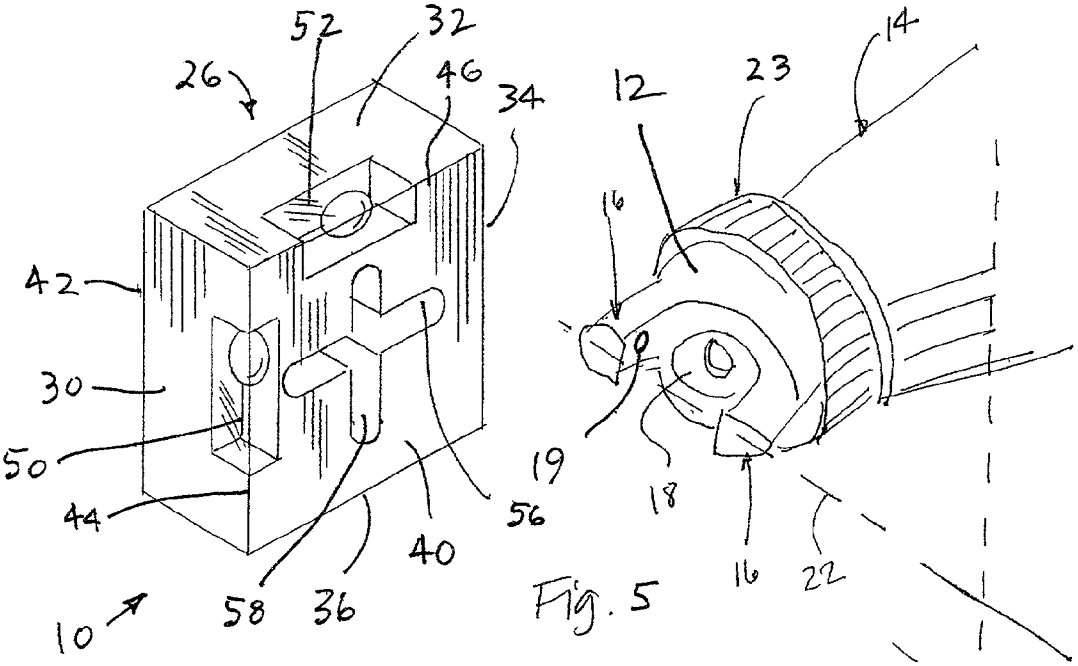
FIG. 5 illustrates a perspective view of the device illustrated in FIG. 1 being placed on an air cap of an automatic spray gun with the air cap generally oriented to produce a vertical fan shaped spray.

A device 10 is provided for orienting an air cap 12 of an automatic applicator or spray gun 14. As illustrated in FIGS. 2 and 5, spray gun 14 includes air cap 12 having horns 16 which protrude forward from a front face 18 of the air cap 12. Horns 16 include air passages which terminate at orifices 19, only one of which is illustrated in each of FIGS. 2 and 5, for aiding in the atomization and shaping of a spray of atomized fluid particles, such as liquid coating material particles. The air cap 12 is capable of being oriented with horns 16 in any orientation, for example, with the axis which extends between them vertical, as illustrated at 20 in FIG. 2, with the axis which extends between them horizontal, as illustrated at 22 in FIG. 5, or anywhere in between. This is generally done by loosening the nut 23 that binds the air cap 12 frictionally against the front face of the gun 14, thus freeing the air cap 12 from frictional engagement with the gun 14, turning the air cap 12 to the desired orientation, and tightening the nut 23 to again bind the air cap 12 frictionally against the front face of the gun 14. For automatic guns, generally the vertical orientation of the horns 16 illustrated in FIG. 2, and the horizontal orientation of the horns 16 illustrated in FIG. 5 are the most commonly encountered orientations. The vertical orientation of the horns 16 illustrated in FIG. 2 generally results in a somewhat fan-shaped, somewhat elliptical-cross section coating material spray having a long dimension which extends generally horizontally. The horizontal orientation of the horns 16 illustrated in FIG. 5 generally results in a somewhat fan-shaped, somewhat elliptical-cross section coating material spray having a long dimension which extends generally vertically. Device 10 is provided to aid a user in adjusting and properly positioning the horns 16 of air cap 12.

Device 10 includes a body 26 which has a shape which provides for easy gripping and manipulation of the device 10 by a worker who is setting up the gun 14 for a spraying operation. Illustratively, the body 26 is generally right rectangular prism-shaped, having four rectangular side faces 30, 32, 34, 36 and two square end faces 40, 42. At the edges 44, 46 between two adjacent side faces 30, 32 and one, 40, of the end faces, two levels 50, 52 which may, for example, be bubble tubes from spirit levels, mercury levels, or the like, are provided. Two intersecting orthogonal slots 56, 58 extend completely through body 26 from end face 40 to end face 42. The orthogonal slots 56, 58 may be sized to receive the horns 16 of air caps 12 of multiple standard sizes, or slot 56 may be sized to receive the horns 16 of air caps 12 of one or more standard sizes and slot 58 sized to receive the horns 16 of air caps 12 of one or more different standard sizes. Alternatively, slots 56 can be tapered from a size which receives one or more standard size horns 16 on one face 40 to a size which receives one or more other standard size horns 16 on the other face 42, and slot 58 can be tapered from a size which receives yet a third standard size horns 16 on one face 40 to a size which receives a fourth standard size horns 16 on the other face 42. Alternatively, different devices 10 may be provided for air caps 12 having different size horns 16.

The levels 50, 52 are so oriented in the body 26 that when the horns 16 of an air cap 12 engage one, 56, of the orthogonal slots 56, 58, and the horns 16 are oriented vertically, along axis 20 in FIG. 2, one, 50, of the levels 50, 52 indicates level, and when the device 10 is then turned ninety degrees with the horns 16 of the air cap 12 still engaging that slot 56, the other level 52 indicates level.

Similarly, when the horns 16 of an air cap 12 engage slot 58 and the horns 16 are oriented vertically, level 52 indicates level, and if the device 10 is then turned ninety degrees with the horns 16 of the air cap 12 still engaging that slot 58, the other level 50 indicates level.

Of course, the device 10 need only have one slot rather than two orthogonal slots 56, 58. Two orthogonal slots 56, 58 are provided in the illustrated device 10 for convenience. The two orthogonal slots 56, 58 also could be sized to accommodate different standard sizes of air horns 16. Also, it is not necessary for the device 10 to have two levels 50, 52. One level may be sufficient if, for example, two orthogonal slots 56, 58 are provided, or if air caps 12 are only to be oriented in one orientation using it.

It should also be understood that, although the illustrated device 10 is designed to indicate when the horns 16 of an air cap 12 are oriented along vertical axis 20 illustrated in FIG. 2 or along horizontal axis 22 illustrated in FIG. 5, devices 10 can be provided which indicate other orientations of the horns 16 as well, for example, 45° in one or the other direction from vertical or horizontal. It should also be understood that while slots 56, 58 in the illustrated embodiment are sized to receive both horns 16 of an air cap 12, separate openings could be provided for each horn 16. It should further be understood that while slots 56, 58 extend all the way through body 26, separate blind openings for horns 16 could be provided in each face 40, 42, or blind openings for horns 16 could be provided in only one face 40 or 42.

Device 10 is of a size which facilitates gripping of device 10 by a worker to maintain the orientation of the air cap 12 while the nut 23 is being tightened, so that the adjusted orientation of the air cap 12, for example, with horns 16 oriented along vertical axis 20 illustrated in FIG. 2 or along horizontal axis 22 illustrated in FIG. 6, is not disturbed. To this end, the configuration of device 10 may advantageously be other than the illustrated generally right rectangular prism shape. For example, it could be a right circular cylindrical in shape with a grooved, knurled or otherwise textured sidewall to facilitate gripping and holding or turning by the worker.

Although this invention has been described in detail with reference to certain embodiments, variations and modifications exist within the scope and spirit of the invention as described and defined in the following claims.

What is claimed is:

1. A device for positioning an air cap of a pneumatically aided atomizer, the air cap having air horns extending therefrom, the device providing at least one first opening adapted to receive the horns and a first level for indicating when the horns received in the at least one first opening are in a first orientation.

2. The device of claim 1 further including at least one second opening adapted to receive the horns and a second level for indicating when the horns received in the at least one second opening are in the first orientation.

3. The device of claim 2 wherein the at least one second opening and second level are oriented orthogonally with respect to the at least one first opening and first level, respectively.

4. The device of claim 3 wherein the second level for indicating when the horns received in the at least one first opening are in the second orientation is a second level for indicating when the horns received in the at least one first opening are in a vertical orientation.

5. The device of claim 3 wherein the second level for indicating when the horns received in the at least one first opening are in the second orientation is a second level for indicating when the horns received in the at least one first opening are in a horizontal orientation.

6. The device of claim 2 including a first surface extending generally in a first direction when the horns are received in one of the at least one first opening and the at least one second opening and a second surface extending generally in a second direction opposite the first direction when the horns are received in one of the at least one first opening and the at least one second opening.

7. The device of claim 6 wherein the at least one first opening and the at least one second opening extend through the device from the first surface to the second surface.

8. The device of claim 6 including at least a third surface extending between the first and second surfaces, the third surface configured to facilitate manipulation of the air cap when the horns are received in one of the at least one first opening and the at least one second opening.

9. The device of claim 1 including a first surface extending generally in a first direction when the horns are received in the at least one first opening and a second surface extending generally in a second direction opposite the first direction when the horns are received in the at least one first opening.

10. The device of claim 9 wherein the at least one first opening extends through the device from the first surface to the second surface.

11. The device of claim 1 wherein the first level for indicating when the horns received in the at least one first opening are in the first orientation is a first level for indicating when the horns received in the at least one first opening are in a vertical orientation.

12. The device of claim 1 wherein the first level for indicating when the horns received in the at least one first opening are in the first orientation is a first level for indicating when the horns received in the at least one first opening are in a horizontal orientation.

13. A method of positioning an air cap of a pneumatically aided atomizer, the air cap having air horns extending therefrom, the method including providing a device having at least one first opening adapted to receive the horns and a first level for indicating when the horns received in the at least one first opening are in a first orientation.

14. The method of claim 13 wherein providing a device having at least one first opening adapted to receive the horns and a first level for indicating when the horns received in the at least one first opening are in a first orientation includes providing a device having at least one first opening adapted to receive the horns, at least one second opening adapted to receive the horns, a first level for indicating when the horns received in the at least one first opening are in the first orientation, and a second level for indicating when the horns received in the at least one second opening are in the first orientation.

15. The method of claim 14 wherein providing a device having at least one first opening adapted to receive the horns, at least one second opening adapted to receive the horns, a first level for indicating when the horns received in the at least one first opening are in the first orientation, and a second level for indicating when the horns received in the at least one second opening are in the first orientation includes providing a device having at least one first opening adapted to receive the horns, at least one second opening adapted to receive the horns and oriented orthogonally with respect to the at least one first opening, a first level for indicating when the horns received in the at least one first opening are in the first orientation, and a second level oriented orthogonally with respect to the first level for indicating when the horns received in the at least one second opening are in the first orientation.

16. The method of claim 14 wherein providing a device having at least one first opening adapted to receive the horns and a first level for indicating when the horns received in the at least one first opening are in a first orientation and at least one second opening adapted to receive the horns and a second level for indicating when the horns received in the at least one second opening are in a first orientation together include providing a device including a first surface extending generally in a first direction when the horns are received in one of the at least one first opening and the at least one second opening and a second surface extending generally in a second direction opposite the first direction when the horns are received in one of the at least one first opening and the at least one second opening.

17. The method of claim 13 wherein providing a device having at least one first opening adapted to receive the horns and a first level for indicating when the horns received in the at least one first opening are in a first orientation includes providing a device having a first surface extending generally in a first direction when the horns are received in the at least one first opening and a second surface extending generally in a second direction opposite the first direction when the horns are received in the at least one first opening.

18. The method of claim 17 wherein providing a device having at least one first opening, a first surface extending generally in a first direction when the horns are received in the at least one first opening and a second surface extending generally in a second direction opposite the first direction when the horns are received in the at least one first opening together include providing at least one first opening which extends through the device from the first surface to the second surface.

19. The method of claim 17 wherein providing a device having a first surface extending generally in a first direction when the horns are received in the at least one first opening and a second surface extending generally in a second direction opposite the first direction when the horns are received in the at least one first opening include providing a device including at least a third surface extending between the first and second surfaces, the third surface configured to facilitate manipulation of the air cap when the horns are received in the at least one first opening.

* * * * *